(12) United States Patent
Uraki et al.

(10) Patent No.: US 6,796,289 B2
(45) Date of Patent: Sep. 28, 2004

(54) IGNITION CONTROL APPARATUS FOR ENGINE WITH TURBOCHARGER

(75) Inventors: Mamoru Uraki, Saitama (JP); Sumio Sato, Saitama (JP); Kazunori Okada, Saitama (JP); Kazuhiko Tomoda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/282,199

(22) Filed: Oct. 29, 2002

(65) Prior Publication Data

US 2003/0126860 A1 Jul. 10, 2003

(30) Foreign Application Priority Data

Oct. 30, 2001 (JP) .......................................... 2001-333309

(51) Int. Cl.[7] .............................................. F02D 13/00
(52) U.S. Cl. .............................. 123/406.5; 123/406.52
(58) Field of Search ........................ 123/406.5, 406.52, 123/406.51, 406.29

(56) References Cited

U.S. PATENT DOCUMENTS 4,242,996 A * 1/1981 Urbansky .............. 123/406.67
4,485,626 A * 12/1984 Moriguchi et al. ............ 60/602
4,705,001 A * 11/1987 Danno et al. ........... 123/339.19
4,856,481 A * 8/1989 Kamise et al. ............ 123/406.3
5,979,404 A * 11/1999 Minowa et al. ............. 123/399
6,260,545 B1 * 7/2001 Suzuki ........................ 123/550
6,343,585 B1 * 2/2002 Fujieda et al. .............. 123/295
6,553,949 B1 * 4/2003 Kolmanovsky et al. ... 123/48 B

* cited by examiner

Primary Examiner—John Kwon
(74) Attorney, Agent, or Firm—Birch, Stewart, Kolasch & Birch, LLP (57) ABSTRACT

The burning of unburned fuel in an exhaust pipe is a technique for preventing a turbo lag. However, since the technique requires combustion in the exhaust pipe, the temperature in the exhaust pipe becomes high, which is likely to damage the exhaust pipe, cause the exhaust emissions to deteriorate. The present invention addresses this problem by providing an ignition control apparatus for an engine with a turbocharger, capable of adjusting an ignition timing and a turbocharger. When a throttle valve is opened rapidly, the ignition control apparatus causes the ignition timing to advance with respect to the ordinary ignition timing. Consequently, the start of combustion is advanced, and the speed of rotation of the engine is raised, thereby increasing the speed of an exhaust turbine to achieve the desired increase in engine performance, without the problems of conventional ignition control systems.

13 Claims, 8 Drawing Sheets

FIG.8(a) COMPARATIVE EXAMPLE

FIG.8(b) COMPARATIVE EXAMPLE

FIG.8(c) EMBODIMENT

FIG.8(d) EMBODIMENT
SPEED OF ROTATION OF AN EXHAUST TURBINE

IGNITION CONTROL APPARATUS FOR ENGINE WITH TURBOCHARGER

CROSS-REFERENCE TO RELATED APPLICATION

The present application claims priority under 35 U.S.C. §119 to Japanese Patent Application No. 2001-333309 filed on Oct. 30, 2001, the entire contents of which are hereby incorporated by reference.

BACKGROUND OF THE INVENTION

1. Field of the Invention

This invention relates to improvements in an engine control apparatus for an engine with a turbocharger.

2. Description of Background Art

A technique of providing a turbocharger to an engine to raise the output power of the engine significantly is well known in the art. However, the technique has a drawback that, upon acceleration of the engine, inevitably there is a lag (turbo lag) in the increase in speed of the turbocharger. Thus, the timing of supplying the supercharged air lags.

One known countermeasure against this is the "Control Apparatus for Engine with Turbocharger" described in the official gazette of Japanese Patent Laid-open No. Hei 5-321804. According to this technique, in order to cause a turbocharger to operate as quickly as possible upon acceleration of the engine, rich air fuel mixture is supplied into and burned in an exhaust pipe (exhaust manifold). This increases the exhaust gas pressure, and the speed of rotation of an exhaust turbine is raised with the higher exhaust gas pressure in order to obtain a higher supercharged air pressure.

According to the technique described above, upon acceleration of an engine, a required supercharged air pressure can be supplied to an intake system, and the responsiveness of the engine can be further increased.

However, since the technique is based upon combustion in an exhaust pipe, the temperature of the exhaust pipe becomes high, and damage to the exhaust pipe can become significant. Further, there is the possibility that the emission may be deteriorated.

SUMMARY AND OBJECTS OF THE INVENTION

Therefore, it is an object of the present invention to provide a technique that can improve the responsiveness of the engine upon acceleration, while at the same time extend the life of an exhaust pipe and maintain good emissions.

In order to attain the object described above, a first aspect of the present invention is based upon an ignition control apparatus for an engine with a turbocharger which includes an ignition timing control section for adjusting an ignition timing and a turbocharger, wherein the ignition timing control section carries out control of changing over the ignition timing which has been an ordinary ignition timing to a corrected ignition timing advanced with respect to the ordinary ignition timing on a condition that a throttle valve which has been in a closed state has opened rapidly.

In the engine with a turbocharger, immediately after the throttle valve opens rapidly, the supercharged air pressure is low when compared with that in an ordinary operation state, and therefore, the knocking toughness is high. Therefore, when the throttle valve is opened rapidly, the ignition timing is advanced with respect to the ordinary ignition timing. Consequently, the start of combustion is advanced, and increase of the output power of the engine and generation of exhaust gas can be urged to increase the speed of an exhaust turbine, and thus to increase engine output performance and driving performance. While combustion in an exhaust pipe is used conventionally, the present invention only requires ordinary combustion in a combustion chamber. Therefore, there is no possibility that the temperature of the exhaust pipe may rise abnormally. Thus, the life of the exhaust pipe can be extended, and the emission can be well maintained.

According to a second aspect of the present invention, the ordinary ignition timing is set to an upper limit value or a value proximate to the upper limit value on a condition that the throttle valve is not opened rapidly and knocking does not occur.

Where also the ordinary ignition timing is set to the upper limit value or a value proximate to the upper limit value, that is, advanced to the utmost, the start of combustion can be advanced and generation of exhaust gas can be urged to advance a rise of the exhaust gas turbine and urge increase of the supercharged air pressure.

According to a third aspect of the present invention, the ignition timing control section starts integration of an amount of rotation of the engine at a point of time at which the ignition timing is changed over to the corrected ignition timing. Conversely, the ignition timing control section carries out control of returning the ignition timing to the ordinary ignition timing after a point of time at which the integrated amount of rotation reaches a predetermined value.

If a fixed interval of time elapses, then the speed of rotation of the exhaust turbine rises sufficiently and a high supercharged air pressure is obtained. Therefore, at a point of time when the integrated amount of rotation reaches the predetermined value, the ignition timing is returned from the corrected ignition timing to the ordinary ignition timing. Excessive advancement gives rise to knocking. In this regard, according to the present invention, good operation of the engine can be continued while preventing knocking.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention is described below with reference to the accompanying drawings. It is to be noted that the terms front, rear, left, and right are defined as directions as viewed from the driver. Further, the drawings should be viewed in the direction of the reference characters.

Figure 1:
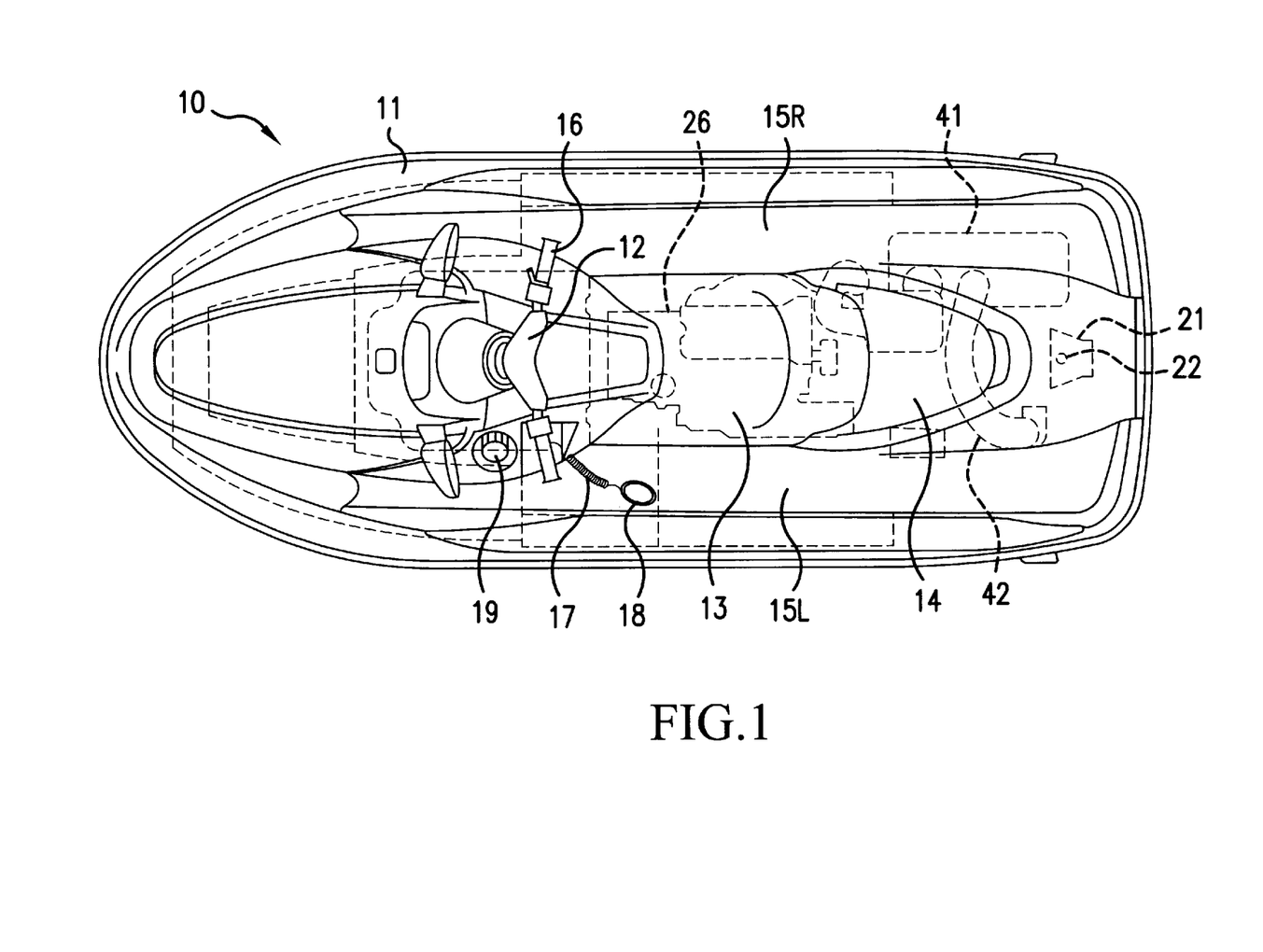
FIG. 1 is a plan view of a jet propulsion watercraft in which an engine with a turbocharger according to the present invention is incorporated.

FIG. 1 is a plan view of a jet propulsion watercraft in which an engine with a turbocharger according to the present invention is incorporated. The jet propulsion watercraft 10 includes a steering handle 12, a driver's seat 13, and a passenger's seat 14 provided in order from the front to the rear on an upper face of a watercraft body 11, and steps 15L and 15R (L denotes the left and R denotes the right as viewed from the driver) are provided on the left and right of the seats 13 and 14. For equipments in the watercraft body 11, only reference characters of them are indicated, and contents of them are described with reference to FIG. 2.

Figure 2:
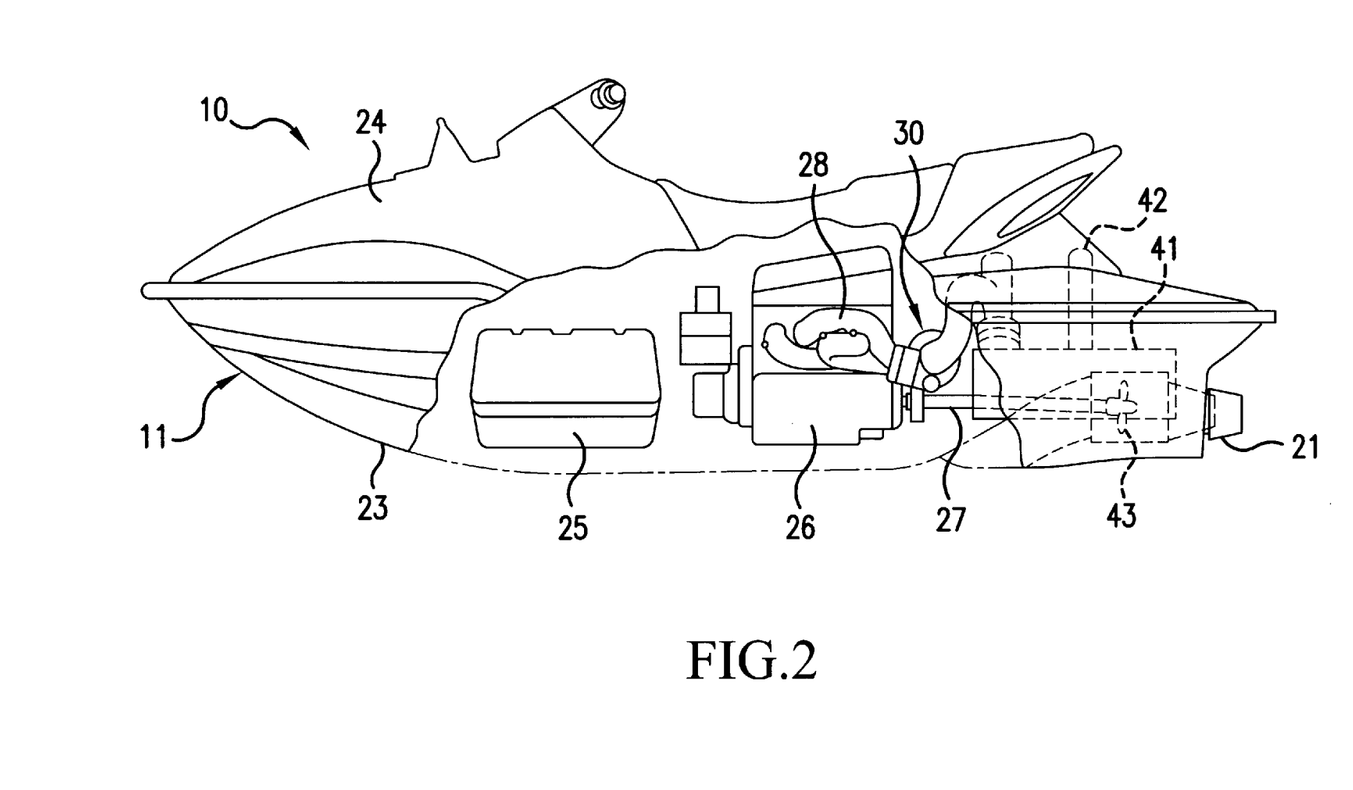
FIG. 2 is a side elevational view of the jet propulsion watercraft in which the engine with a turbocharger according to the present invention is incorporated.

FIG. 2 also shows an accelerator grip 16, and the speed of an engine can be controlled by turning the accelerator grip 16 similarly as in a motorcycle. A lanyard 17 is connected at one end thereof to a main switch, and tied at the other end to an arm or the body of the driver by a ring 18, such that when the driver moves by a great distance away from its normal position, tension is applied to the lanyard 17 to pull out the main switch thereby to stop the engine. A fuel filler 19, allows, when a cap is removed therefrom, for fuel to be supplied into a fuel tank disposed in the watercraft body 11. Steering nozzle 21 operates in an interlocking relationship with the steering handle 12 to swing leftward and rightward around a pin 22. As a result, the jet direction of jet water can be changed to turn (steer) the watercraft body 11.

FIG. 2 is a side elevational view of the jet propulsion watercraft in which the engine with a turbocharger according to the present invention is incorporated. The watercraft body 11 is a hollow structure wherein a hull 23 is covered with a deck 24. The jet propulsion watercraft 10 is a small ship wherein a fuel tank 25, an engine 26, a propeller shaft 27, an exhaust manifold 28, a turbocharger 30, a water muffler 41, an inverted U-shaped connection pipe 42 and so forth are accommodated in the watercraft body 11 and jet water produced by an impeller 43 provided at an end of the propeller shaft 27 is jetted to advance the jet propulsion watercraft 10 itself, and therefore, it is called jet propulsion watercraft.

Exhaust gas from the engine 26 flows in order through the exhaust manifold 28, turbocharger 30, water muffler 41 and inverted U-shaped connection pipe 42 while part of energy held by the exhaust gas is recovered in the form of pressurization of intake air by the turbocharger 30. Sound attenuation and dropping of the temperature of the exhaust gas are performed by the water muffler 41 in which water is stored, whereafter the exhaust gas is exhausted into water or jet water through the inverted U-shaped connection pipe 42.

Figure 3:
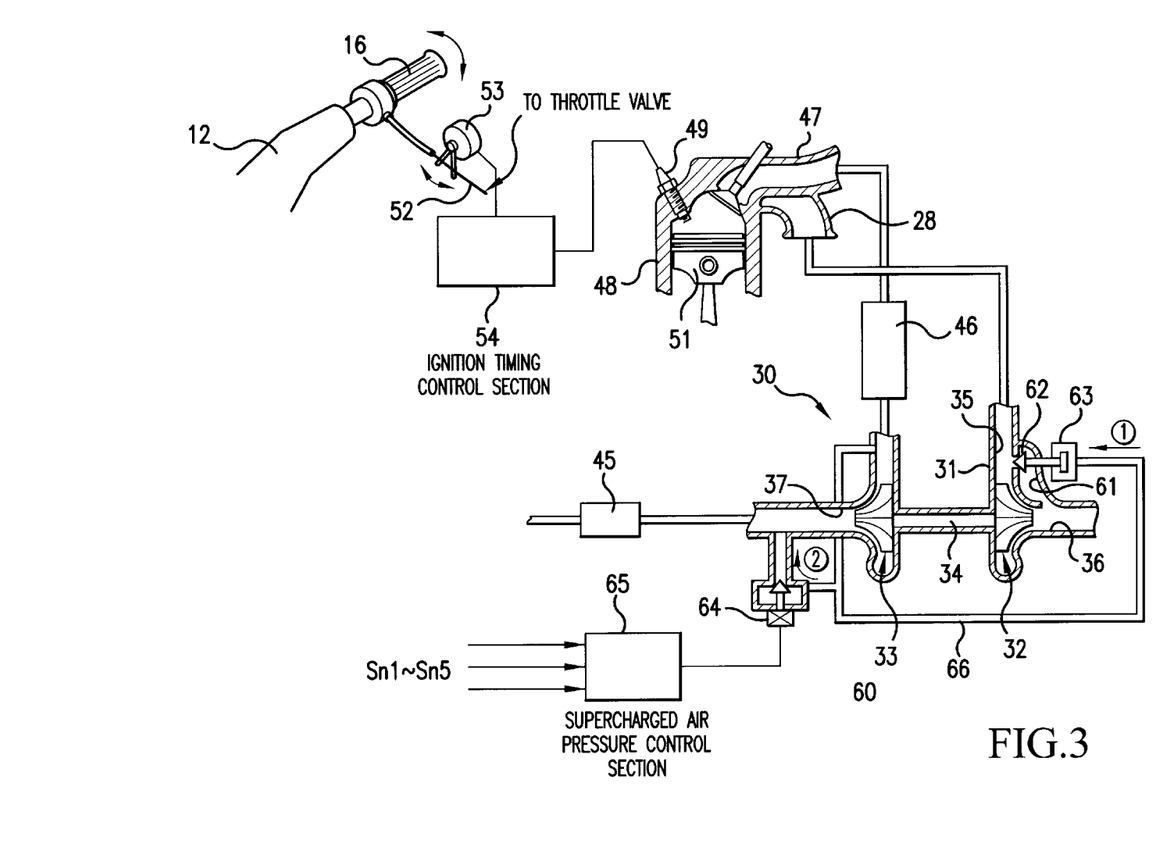
FIG. 3 is a schematic view illustrating operation of the engine according to the present invention, an ignition plug and the turbocharger.

FIG. 3 is a schematic view illustrating operation of the engine according to the present invention, the ignition plug and the turbocharger. First, the turbocharger 30 includes a charger case 31 in which an exhaust turbine 32, an intake compressor 33 and a connection pipe 34 for interconnecting them are accommodated, and takes in exhaust gas of a high temperature into a turbine entrance 35 through the exhaust manifold 28 to turn the exhaust turbine 32 with the exhaust gas and then exhausts the exhaust gas after used from a turbine exit 36.

Meanwhile, air introduced into a compressor entrance 37 through an air cleaner 45 is pressurized by the intake compressor 33, and then the air is cooled by an intercooler 46 to cancel an increment by which the temperature of the air has risen through the pressurization. Thereafter, the air is fed into a cylinder 48 of the engine through an intake manifold 47. In the cylinder 48, the air is mixed with a suitable amount of fuel and the air-fuel mixture is ignited by an ignition plug 49 to push down a piston 51.

The accelerator grip 16 basically controls the opening of a throttle valve not shown through a throttle wire 52. Simultaneously, the opening of the throttle valve is detected directly or indirectly by a throttle amount sensor 53.

Further, in the present invention, a detection signal of the throttle amount sensor 53 is fetched into an ignition timing control section 54, by which adjustment of the ignition timing of the ignition plug 49 is carried out.

Further, in the present embodiment, a supercharged air pressure control mechanism 60 is provided for the turbocharger 30. The supercharged air pressure control mechanism 60 is a mechanism for preventing the loss of a load balance caused by relatively excessive rise of the exhaust gas pressure, excessive decrease of the supercharging object air amount or some other factor, which causes the exhaust turbine 32 and the intake compressor 33 to rotate at an abnormally high speed. The turbocharger 30 has a configuration wherein, for example, a bypass path 61 is provided for the exhaust turbine 32 such that it can be closed up with a waste gate 62. The waste gate 62 is driven by a gate actuator 63 whose operation pressure is controlled by a gate control solenoid 64 and a supercharged air pressure control section 65.

If the waste gate 62 is closed, then the overall amount of exhaust gas is introduced into the exhaust turbine 32 to rotate the exhaust turbine 32 at a high speed. When the speed of rotation is high, the supercharged air pressure is high.

If the waste gate 62 is open, then part of exhaust gas escapes into the bypass path 61 and the remaining part of the exhaust gas is introduced into the exhaust turbine 32. Consequently, the speed of rotation of the exhaust turbine 32 is low. When the speed of rotation is low, the supercharged air pressure is low.

Accordingly, the supercharged air pressure can be controlled by opening/closing control of the waste gate 62.

More particularly, the supercharged air pressure control section 65 fetches an engine speed Sn1, a throttle amount (throttle opening) Sn2, an intake air temperature Sn3, an engine oil temperature Sn4, a supercharged air pressure Sn5 and so forth and calculates a target supercharged air pressure Cp from them.

If the target supercharged air pressure Cp<supercharged air pressure Sn5, then the supercharged air pressure control section 65 operates the gate control solenoid 64 in an opening direction or in an opening increasing direction or, in the case of pulse control, in an opening timing increasing direction, in response to the pressure difference (Sn5−Cp).

Part of pressurized air having acted upon the gate actuator 63 as indicated by an arrow mark ① escapes as indicated by another arrow mark ② and the pressure in a connecting tube 66 drops. As a result, the pressing force of the arrow mark ① decreases and the waste gate 62 opens, and consequently, part of exhaust gas escapes into to the bypass path 61. Accordingly, the speed of rotation of the exhaust turbine 32 drops and the supercharged air pressure drops.

If the target supercharged air pressure Cp>supercharged air pressure Sn5, then the waste gate 62 is closed to raise the supercharged air pressure by the reverse action.

However, even with the configuration described above, if the throttle valve is opened rapidly, then the following problem arises.

If the accelerator grip 16 is turned from a closed position to a fully open position, then the engine 26 responds well to this and increases the crank speed.

Meanwhile, the exhaust turbine 32, connection pipe 34 and intake compressor 33 naturally have a mass (mass), and in order to accelerate the mass, a certain period of time for acceleration is required, and even if the exhaust gas increases, the speed of the mass does not increase immediately. This is a subject referred to as turbo lag.

It is well known in the art that, if the mass is fixed, then the acceleration time period can be reduced as the energy (heat and amount) of the exhaust gas increases, and the inventors of the present invention have perceived in the course of investigation of a measure for increase of the energy of exhaust gas.

In particular, the inventors have taken notice of a phenomenon that the supercharged air pressure drops temporarily upon rapid throttle opening. This phenomenon occurs because, although the speed of the piston increases in response to the rapid throttle opening, the supply of air to the intake compressor 33 is delayed through the turbo lag and the sucking action of the piston prevails the air supply, resulting in drop of the supercharged air pressure.

In an engine, a rise of the temperature of intake air and a rise of the supercharged air pressure lead to occurrence of knocking, and conversely, a drop of the supercharged pressure increases the knocking toughness.

If the knocking toughness increases, then the ignition timing can be advanced. This is because knocking does not occur even if the ignition time is advanced by some degree.

If the ignition timing is advanced, then the start of combustion is advanced, and increase of the output power of the engine and generation of exhaust gas can be urged. As a result, the rotation of the engine can be increased slightly earlier than when in the ordinary (normal) control, and thus the rotation speed of the exhaust turbine can be advanced also.

Subsequently, a control flow according to the present invention is described. However, maps (a general term of graphs, operational expressions and so forth) used in the control flow are described first.

Figure 4A:
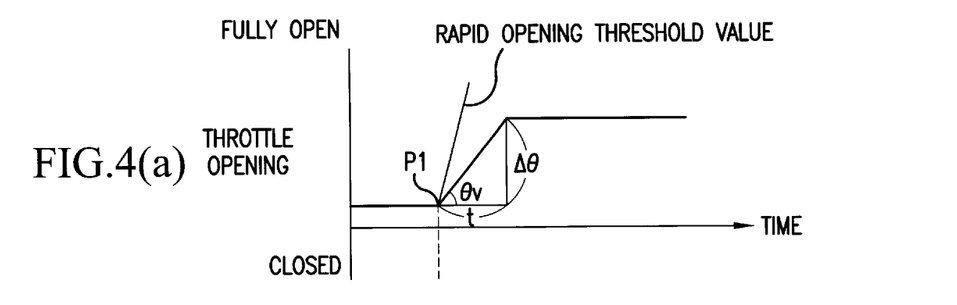
FIGS. 4(a)–(c) are diagrams illustrating an ordinary ignition timing.
Figures 4B, 4C:
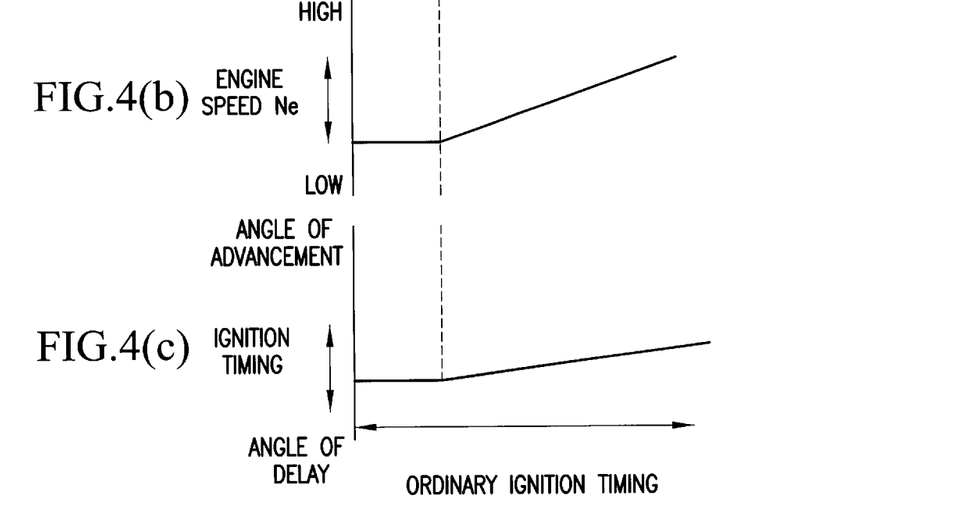

FIGS. 4(*a*) to (*c*) are diagrams illustrating the ordinary ignition timing, where the abscissa represents the time. FIG. 4 (*a*) indicates the throttle opening, FIG. 4(*b*) the engine speed, and FIG. 4(*c*) the ignition timing.

It is assumed that the throttle in the closed state is opened at a normal speed at a point P1 in FIG. 4(*a*). If the throttle variation amount then is represented by Δθ and the variation time period is represented by t, then the speed θv can be determined in accordance with θv=(Δθ/t). If the speed is on the right side of a rapid opening threshold value indicated in the graph, then it is regarded as an ordinary speed.

In FIG. 4(*b*), the engine increases because the throttle valve has opened.

In FIG. 4(*c*), since the ignition timing is normally set to an ignition timing corresponding to the speed of rotation of the engine, the ignition timing varies in response to an increase of the speed of rotation of the engine. In other words, the graph shown in (c) represents the ordinary ignition timing.

Figure 5A:
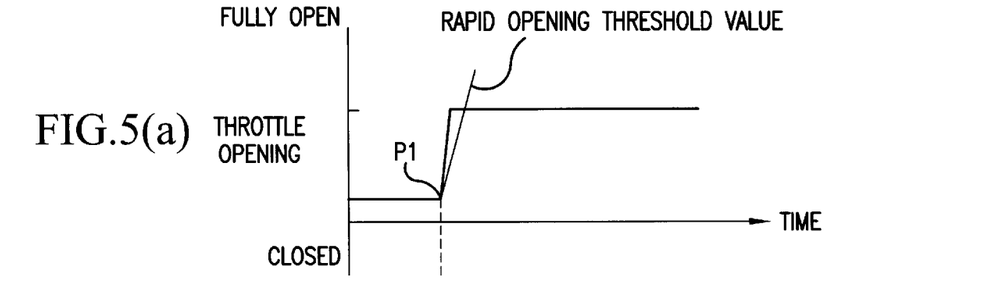
FIGS. 5(a)–(c) are diagrams illustrating a corrected ignition timing adopted in the present invention.
Figure 5B:
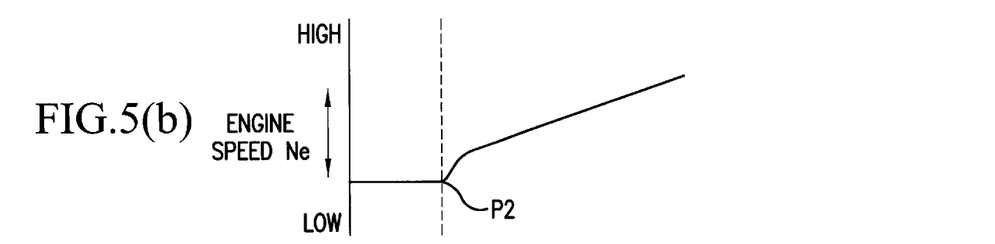
Figure 5C:
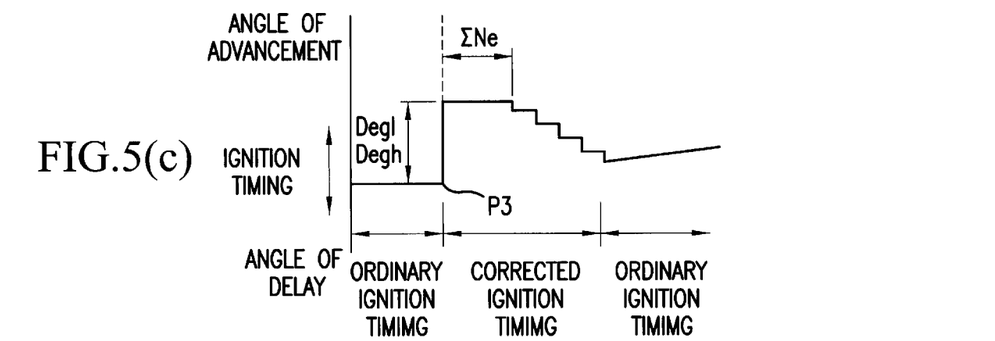

FIGS. 5(*a*) to (*c*) are diagrams illustrating a corrected ignition timing adopted in the present invention, where the axis of the abscissa represents the time. FIG. 5 (*a*) indicates the throttle opening, FIG. 5(*b*) the engine speed, and FIG. 5(*c*) the ignition timing.

It is assumed that the throttle in the closed state is opened rapidly at a point P1 in (a). If the speed then is on the left side of a rapid opening threshold value indicated in the graph, then the opening is regarded as rapid opening.

In FIG. 5(*b*), the engine increases because the throttle valve has opened. However, since the throttle has been opened rapidly, the curve rises rapidly immediately after a point P2.

In FIG. 5(*c*), the ignition timing is changed over from the ordinary ignition timing to the corrected ignition timing at a point P3 at which information that the throttle speed has exceeded the rapid opening threshold value is received. The corrected ignition timing is the ordinary ignition timing advanced by Degl or Degh. The lead angle amounts Degl and Degh are hereinafter described.

Such ignition control with the corrected ignition timing is continued for a period of time of ΣNe, and thereafter, the lead angle amount is gradually decreased until the ordinary ignition timing is restored. It can be said that, as a result, the curve FIG. 5(*b*) is obtained.

Figure 6A:
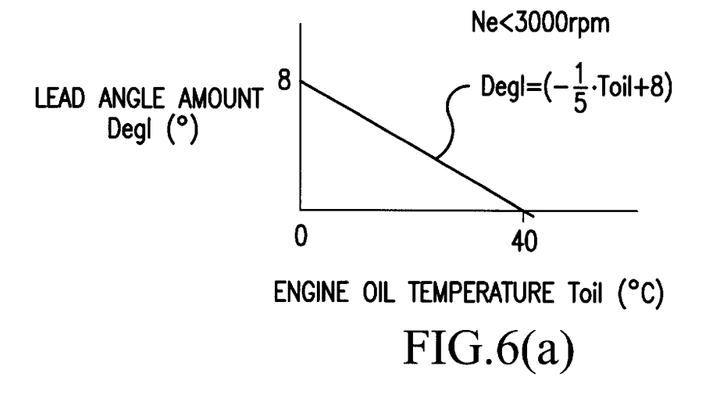
FIGS. 6(a)–(b) are graphs illustrating a relationship between an engine oil temperature and a lead angle amount adopted in the present invention.
Figure 6B:
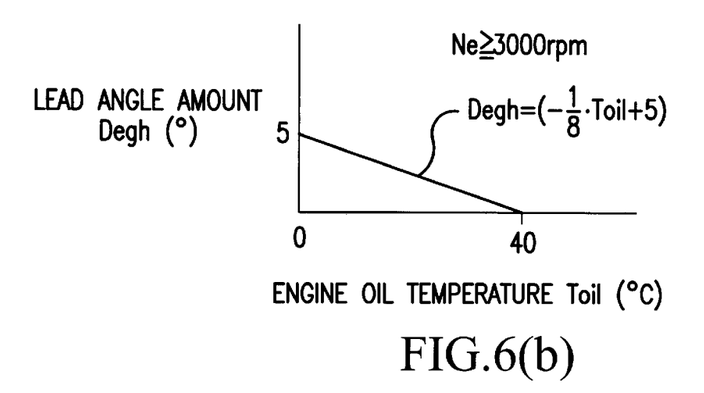

FIGS. 6(*a*) and (*b*) are graphs of a relationship between the engine oil temperature and the lead angle amount adopted in the present invention.

FIG. 6(*a*) is a graph for determining the lead angle amount Degl for a low speed (for example, for a case when the engine speed is lower than 3,000 rpm), and a lead angle corresponding to the engine oil temperature Toil is determined.

FIG. 6(*b*) is a graph for determining the lead angle amount Degh for a high speed (for example, for a case when the engine speed is equal to or higher than 3,000 rpm), and a lead angle corresponding to the engine oil temperature Toil is determined.

The reason why the lead angle amount is set to zero (0) where the engine oil temperature Toil exceeds 40° C. in the graphs described above is that, since the intake air temperature rises if the engine oil temperature rises, knocking is likely to occur.

Further, since, in a low speed state, the engine temperature is low and knocking toughness can be anticipated, the lead angle amount is set to a great amount whereas, in a high speed state, the advancement amount is set to a small amount since the circumstances are converse.

Consequently, finer setting of the corrected ignition timing can be achieved.

Figure 7:
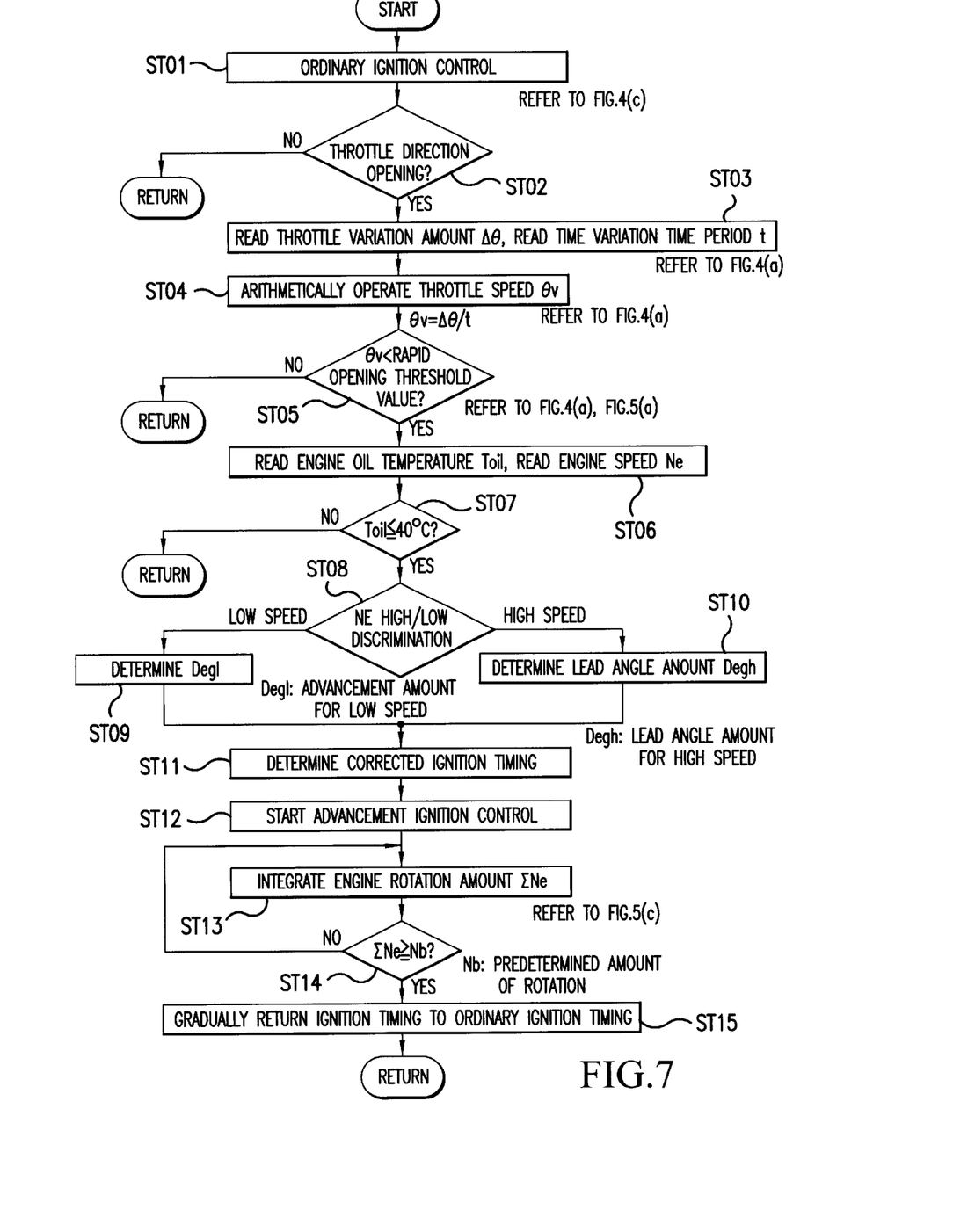
FIG. 7 is a control flow diagram of an ignition timing of the present invention.

FIG. 7 is a control flow diagram of the ignition timing of the present invention, and in FIG. 7, reference character STxx denotes a step number.

ST01: It is assumed that ignition control in accordance with the ordinary ignition timing is being carried out (refer to FIG. 4(*c*)).

ST02: The direction in which the throttle is opened or closed is checked. If the direction is the closing direction, then the processing returns to the start. If the throttle has changed from its closed state to the open state, then the processing advances to step ST03.

ST03: The throttle variation amount $\Delta\theta$ and the variation time period t then are read in (refer to FIG. 4(a)).

ST04: $\theta v=\Delta\theta/t$ is calculated to arithmetically operate the throttle speed $\theta v$ (refer to FIG. 4(a)).

ST05: It is checked whether or not the determined value of $\theta v$ is equal to or higher than the rapid opening threshold value (refer to FIG. 4(a) and FIG. 5(a)). If the discrimination is NO, then the processing returns to the start, but if the discrimination is YES, then it is determined that the throttle has been opened rapidly, and the processing advances to ST06.

ST06: The engine oil temperature Toil and the engine speed Ne are read in.

ST07: It is checked whether or not the engine oil temperature Toil is equal to or lower than 40° C., and if the discrimination is NO, then the processing returns to the start, but if the discrimination is YES, then the processing advances to ST08.

ST08: It is checked whether the engine speed is a high speed or a low speed. If the engine speed is a low speed, then the processing advances to ST09, but if the engine speed is a high speed, then the processing advances to ST10.

ST09: The lead angle amount Degl is determined in accordance with the graph of FIG. 6(a) or the calculation expression.

ST10: The lead angle amount Degh is determined in accordance with the graph of FIG. 6(b) or the calculation expression.

ST11: The ordinary ignition timing is advanced by Degl or Degh to determine the corrected ignition timing.

ST12: Ignition control based on the corrected ignition timing is started.

ST13: Integration of the amount of rotation of the engine is started simultaneously with the start of the ignition control. The integrated value is represented by $\Sigma Ne$ (refer to FIG. 5(c)).

ST14: The advanced ignition timing control is performed until the amount (integrated value) $\Sigma Ne$ of rotation of the engine becomes equal to or greater than a predetermined amount Nb of rotation, and at a point of time when $\Sigma Ne$ becomes equal to or higher than the predetermined amount Nb of rotation, the processing advances to ST15.

ST15: The ignition timing is gradually returned from the corrected ignition timing to the ordinary ignition timing (refer to FIG. 5(c)).

By executing the flow described above, not only a turbo lag is eliminated, but also an appropriate ignition timing can be achieved.

Now, a preferred form of the supercharged air pressure control section 65 described above with reference to FIG. 3 is described.

Figure 8A:
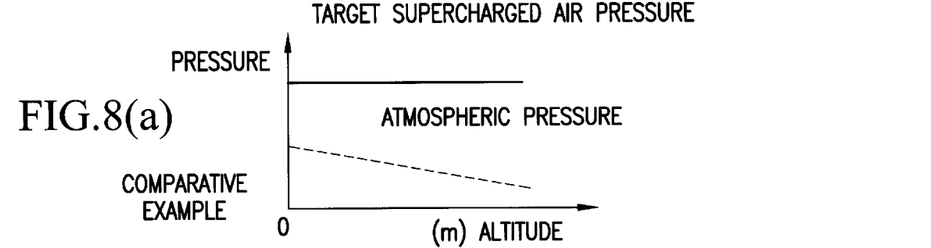
FIGS. 8(a)–(d) are diagrams illustrating a contrast between old and new supercharged air pressure control methods.

FIGS. 8(a) to (d) are diagrammatic views illustrating a contrast between the old and new supercharged air pressure control methods, where axis of the abscissa indicates the time. FIGS. 8(a) and (b) represent that of a comparative example while FIGS. 8(c) and (d) show that of the embodiment. It is to be noted that, in those figures, the axis of abscissa indicates the altitude.

In FIG. 8(a), the axis of ordinate indicates the pressure, and a target supercharged air pressure determined from engine characteristics is indicated by a thick solid line. Meanwhile, the atmospheric pressure indicated by a broken line decreases as the altitude increases.

Figure 8B:
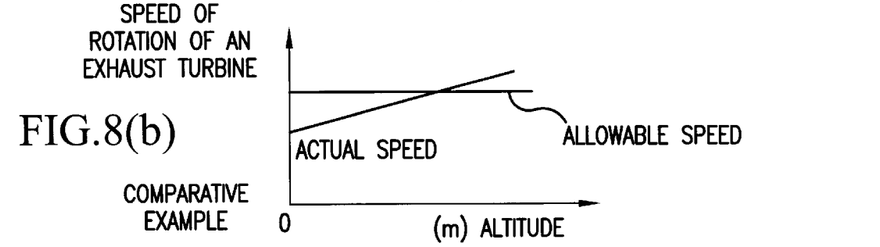

In FIG. 8(b), the axis of ordinate indicates the speed of the exhaust turbine, and since the exhaust turbine is a rotary machine, it is restricted in terms of the allowable speed from a mechanical reason. The actual speed indicated by a thick solid line increases rightwardly upwards in proportion to the altitude. The reason is such as follows.

Since the intake air pressure relies upon the atmospheric pressure, as the altitude increases, the intake air pressure decreases. Therefore, the control section tries to increase the speed of rotation of the intake air compressor to generate the target supercharged air pressure indicated in FIG. 8(a). Therefore, as the altitude increases, the actual speed increases, and there is the possibility that the actual speed may exceed the allowable speed.

A countermeasure against this is described.

Figure 8C:
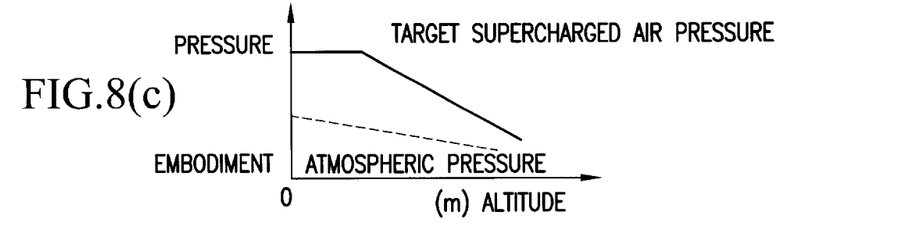

In FIG. 8(c), the target supercharged air pressure is decreased after a certain altitude is reached.

Figure 8D:
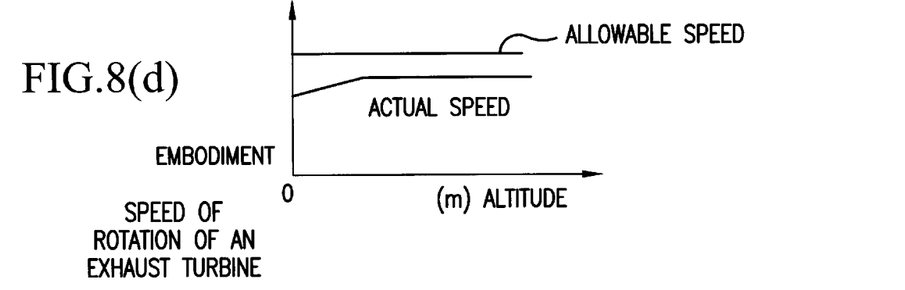

As a result, the actual speed can be restricted to the allowable speed as seen from FIG. 8(d).

If altitude correction based on FIGS. 8(c) and (d) is carried out, then increase of the output power of the engine can be achieved on a flat place, but at a high place, excessively high speed rotation of the turbocharger can be prevented. Therefore, appropriate output power of the engine can be generated irrespective of the altitude.

It is to be noted that the recitation "a throttle valve which has been in a closed state has opened rapidly" in the first aspect of the present invention is applied to a variation of the opening by 30% or more of the full opening of the throttle valve, that is, a variation of opening by 30 to 100%. The recitation is not applied to a variation of the opening less than 30% because the effect is low although the control is complicated.

Further, the ignition control apparatus according to the present invention may be applied to any of a watercraft engine, a land engine (which may be any of an engine for a two-wheeled vehicle, an engine for a four-wheeled vehicle and an engine for an industrial machine) and an aircraft engine only if it is an engine with a turbocharger.

The present invention exhibits the following effects due to the configuration described above.

In the engine with a turbocharger, immediately after the throttle valve opens rapidly, the knocking toughness is high. Therefore, when the throttle valve is opened rapidly, the ignition timing is advanced with respect to the ordinary ignition timing. Consequently, the start of combustion is advanced, and increase of the output power of the engine and generation of exhaust gas can be urged. In other words, the speed of rotation of the engine can be raised to advance the rise of an exhaust turbine and achieve augmentation of the drivability (driving performance). In conventional systems, combustion in an exhaust pipe occurs. However, according to the first aspect of the present invention only ordinary combustion in a combustion chamber is required. Thus, there is no possibility that the temperature of the exhaust pipe may rise abnormally, and the life of the exhaust pipe can be extended and the emission can be well maintained.

According to the second aspect of the present invention, the ignition control apparatus for an engine with a turbocharger is characterized in that the ordinary ignition timing is set to an upper limit value or a value proximate to the upper limit value on condition that the throttle valve is not opened rapidly and knocking does not occur.

Where also the ordinary ignition timing is set to the upper limit value or a value proximate to the upper limit value, that is, advanced to the utmost, the start of combustion can be advanced and generation of exhaust gas can be urged to advance a rise of the exhaust gas turbine and urge increase of the supercharged air pressure.

According to the third aspect of the present invention, the ignition control apparatus for an engine with a turbocharger is characterized in that the ignition timing control section starts integration of an amount of rotation of the engine at a point of time at which the ignition timing is changed over to the corrected ignition timing, and carries out control of returning the ignition timing to the ordinary ignition timing after a point of time at which the integrated amount of rotation reaches a predetermined value.

If a fixed interval of time elapses, then the speed of rotation of the exhaust turbine rises sufficiently and a high supercharged air pressure is obtained. Therefore, at a point of time when the integrated amount of rotation reaches the predetermined value, the ignition timing is returned from the corrected ignition timing to the ordinary ignition timing. Excessive advancement gives rise to knocking. In this regard, according to the present invention, good operation of the engine can be continued while preventing knocking.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ignition control apparatus for an engine with a turbocharger, comprising:
    an ignition timing control section for adjusting an ignition timing and a turbocharger,
    wherein said ignition timing control section carries out control of changing over the ignition timing which has been an ordinary ignition timing to a corrected ignition timing advanced with respect to the ordinary ignition timing when a variation of a throttle opening from a closed state is 30% or more.

2. The ignition control apparatus for an engine with a turbocharger according to claim 1, wherein the ordinary ignition timing is set to an upper limit value or a value proximate to the upper limit value when said variation of said throttle opening is less than 30% and knocking does not occur.

3. The ignition control apparatus for an engine with a turbocharger according to claim 1,
    wherein said ignition timing control section starts integration of an amount of rotation of said engine at a point of time at which the ignition timing is changed over to the corrected ignition timing, and
    wherein said ignition timing control section carries out control of returning the ignition timing to the ordinary ignition timing after a point of time at which the integrated amount of rotation reaches a predetermined value.

4. The ignition control apparatus for an engine with a turbocharger according to claim 1, wherein said ignition timing control section fetches a detection signal of a throttle amount sensor, by which adjustment of said ignition timing of an ignition plug is carried out.

5. The ignition control apparatus for an engine with a turbocharger according to claim 1, an intake side of said turbocharger includes a bypass valve that can be opened and closed by a waste gate driven by a gate actuator, said gate actuator being controlled by a supercharged air pressure control section,
    wherein opening of the waste gate reduces a pressure of exhaust gases in the turbocharger, and closing the waste gate increases the pressure of said exhaust gases in the turbocharger.

6. The ignition control apparatus for an engine with a turbocharger according to claim 5, wherein said supercharged air pressure control section fetches an engine speed $Sn1$, a throttle opening amount $Sn2$, an intake air temperature $Sn3$, an engine oil temperature $Sn4$, and a supercharged air pressure $Sn5$, and calculates said target supercharged air pressure $Cp$,
    wherein said supercharged air pressure control section opens said waste gate in order to reduce a speed of rotation of an exhaust turbine when $Cp<Sn5$, and said supercharged air pressure control section closes said waste gate in order to increase said speed of said exhaust turbine when $Cp>Sn5$.

7. A turbocharger for an engine, comprising:
    an exhaust turbine;
    a supercharged air pressure control section for controlling a waste gate for opening and closing an bypass valve on an intake side of said exhaust turbine; and
    an ignition timing control apparatus having an ignition timing control section for adjusting an ignition timing and a turbocharger, said ignition timing control section changing the ignition timing from an ordinary ignition timing to a corrected ignition when a variation of a throttle opening from a closed state is 30% or more.

8. The turbocharger according to claim 7, wherein the ordinary ignition timing is set to an upper limit value or a value proximate to the upper limit value when said variation of said throttle opening is less than 30% and knocking does not occur.

9. The turbocharger according to claim 7,
    wherein said ignition timing control section starts integration of an amount of rotation of said engine at a point of time when the ignition timing is changed over to the corrected ignition timing, and
    wherein said ignition timing control section carries out control of returning the ignition timing to the ordinary ignition timing after a point of time when the integrated amount of rotation reaches a predetermined value.

10. The turbocharger for an engine according to claim 7, wherein opening of the waste gate reduces a pressure of exhaust gases in the turbocharger, and closing the waste gate increases the pressure of said exhaust gases in the turbocharger.

11. The turbocharger according to claim 10, wherein said supercharged air pressure control section fetches an engine speed $Sn1$, a throttle opening amount $Sn2$, an intake air temperature $Sn3$, an engine oil temperature $Sn4$, and a supercharged air pressure $Sn5$ and calculates said target supercharged air pressure $Cp$,
    wherein said supercharged air pressure control section opens said waste gate in order to reduce a speed of rotation of an exhaust turbine when $Cp<Sn5$, and said supercharged air pressure control section closes said waste gate in order to increase said speed of said exhaust turbine when $Cp>Sn5$.

12. A method of controlling an ignition timing and a turbocharger of an engine with an ignition control apparatus having an an ignition timing control section for adjusting an ignition timing and a turbocharger, said method comprising the steps of:

reading in a variation of throttle amount from a closed state and a period of time;

calculating a speed of throttle opening;

determining whether or not the throttle opening speed is greater or equal to a predetermined rapid opening value;

reading an engine oil temperature and an engine rotation amount when the throttle opening speed is equal to or greater than said predetermined rapid opening value;

determining an lead angle amount depending on said engine oil temperature;

advancing said ordinary ignition timing by said determined lead angle amount to determine said corrected ignition timing;

starting ignition control based on said corrected ignition timing;

simultaneously beginning integration of said engine rotation amount;

performing an advanced ignition timing control until an integrated value of said engine rotation amount becomes equal to of greater than a predetermined amount of rotation; and gradually returning from said corrected ignition timing to said ordinary ignition timing when said integrated value of said engine rotation becomes equal to or greater than said predetermined amount of rotation.

13. The method of controlling an ignition timing according to claim 12, wherein said predetermined rapid opening value is equal to a variation of a throttle opening from a closed state of 30% or more.

* * * * *